Patented Apr. 7, 1942

2,278,492

UNITED STATES PATENT OFFICE 2,278,492

PENTAKISAZO DYE

Swanie S. Rossander and Chiles E. Sparks, Wilmington, Del., assignors to E. I. du Pont de Nemours & Company, Wilmington, Del., a corporation of Delaware No Drawing. Application October 15, 1940, Serial No. 361,267

16 Claims. (Cl. 260—144)

This invention relates to new brown pentakisazo dyes represented by the formula

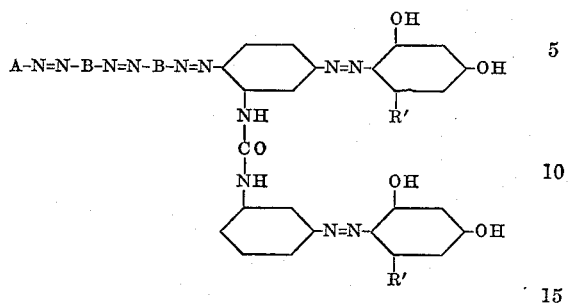

wherein A is the radical of a diazotizable arylamine of a group consisting of the amino benzenes and amino naphthalenes represented by the formulae

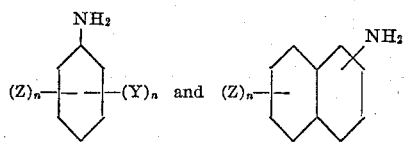

in which Y is from a group consisting of hydrogen, alkyl having 1 to 6 carbons, the corresponding alkoxy groups, halogen and nitro, $n$ is 1 to 2 and Z is from a group consisting of hydrogen and sulfonic acid; each B is the residue after coupling and diazotization of an arylamine represented by the formulae

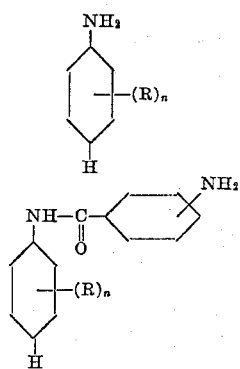

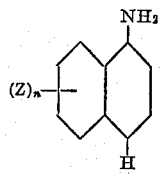

and

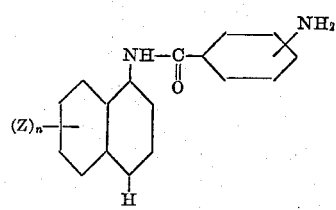

wherein R is from a group consisting of hydrogen, alkyl having 1 to 6 carbons and the corresponding alkoxy groups, —H represents the coupling position; and R' is one of a group consisting of hydrogen, alkyl having 1 to 6 carbons, the corresponding alkoxy groups, hydroxy, amino, halogen, cyano, carboxy and sulfonic acid. The dyes must contain at least one sulfonic acid group and may contain as many as four. The B components may be alike or different members of the indicated group. Halogen refers to chlorine, bromine and fluorine. The invention also relates to complexes of the dyes produced on the fibers and to methods of producing such dyes and complexes.

Direct dyes are those which dye the cloth directly from a water bath without subsequent treatment. Numerous examples of direct colors are known. They are used because they are substantive to cellulosic fibers upon which they produce bright shades which are moderately fast to light. Upon washing these products are very fugitive, showing considerable loss in strength and imparting an undesirable stain to associated uncolored or differently colored fibers. Dyes which can be used by the dyes similarly to direct colors and which possess good washing fastness and do not stain other fibers are desired.

Poor washing fastness has been improved in the so-called diazo colors by azotizing the direct colors on the fiber and developing with suitable coupling components. The diazo colors are faster to washing but duller in shade than the corresponding direct colors. They are objectionable because of the considerable shade change which usually results upon development, and because of the effort and material expense to be borne by the dyer who must carry out the development.

It is among the objects of the invention to provide new pentakisazo dyes which dye cellulosic fibers and similar dyeable materials in shades of brown. Another object of the invention is to provide dyes which by a simple aftertreatment on the fiber with formaldehyde will provide dyeings having superior fastness to washing. Another object of the invention is to provide dyes capable of making good direct dyeings in shades of brown on cellulosic materials which show little or no shade change upon treatment with formaldehyde. Other objects of the invention will be apparent from the following more detailed description.

The invention will be more fully set forth in the following more detailed description which includes examples that are given as illustrative embodiments of the invention and not as limitations thereof. Parts are expressed in parts by weight unless otherwise noted.

*Example I*

A slurry consisting of 30.3 parts of 2-aminonaphthalene-6,8-disulfonic acid in 200 parts of water was made and iced to $10°\pm2°$ C. The amine was diazotized by adding 9.1 parts of hydrochloric acid followed by 6.9 parts of sodium nitrite as fast as the nitrite was absorbed whilst iceing to maintain a temperature of $15°\pm2°$ C. Acidity to Congo red and a slight excess of nitrite was then maintained for fifteen minutes.

While cooled, 11.2 parts of 1-amino-3-methyl-benzene were added to the diazo solution with agitation and five minutes later 27.2 parts of crystalline sodium acetate were added. Agitation was continued for 10–12 hours and the temperature was allowed to rise to room temperature.

The mixture was then cooled to $20°\pm1°$ C. and 16.4 parts of hydrochloric acid quickly added. Then 7.6 parts of sodium nitrite were slowly added. After the last addition of nitrite, a temperature of $23°\pm2°$ C., acidity to Congo red and a medium test for excess nitrite on potassium iodide-starch papers were maintained for 15 minutes. Then 10% salt by volume was added to the diazo slurry. The mixture was stirred 15 minutes, 12 parts of 1-amino-3-methyl-benzene were rapidly added and the latter mixture was stirred 15 minutes longer.

A solution containing 17 parts of sodium carbonate and 50 parts of warm water was made and the solution was slowly added to the coupling mixture over a period of one hour. This mixture was stirred 10–12 hours, whilst maintaining acidity to litmus, and allowing the temperature to rise to that of the surrounding atmosphere.

The disazo was precipitated by heating the charge to $60°\pm1°$ C. adding 10% salt by volume and stirring 30 minutes. Any dye which was not completely out of solution as shown by a spot on filter paper was precipitated by adding 4 parts of hydrochloric acid whilst still leaving the charge neutral to Congo red.

The solids were filtered off and the press cake was slurried with 800 parts of water and dissolved by adding 7 parts of sodium carbonate. The solution was heated to 90° C., diluted to 1320 parts with water and clarified by adding a carbon adsorbent and filtering. The compound was salted out of the filtrate and filtered off.

The press cake was dissolved in 800 parts of water and 9.5 parts of hydrochloric acid were added. The solution was cooled to 20° C. and 7.8 parts of sodium nitrite were added as rapidly as the nitrite was absorbed. An excess of nitrite and acidity to Congo red were maintained for one hour and then the excess nitrite was destroyed with sulfamic acid.

A solution containing 24.2 parts of 3,3'-diamino-sym.-diphenyl urea, 100 parts of water and 7.4 parts of hydrochloric acid was made. The solution was added to the above described diazo slurry and then made neutral to Congo red by adding 34 parts of crystalline sodium acetate. The mixture was stirred 10–12 hours, heated to 70° C., made acid to Congo red paper by adding hydrochloric acid and filtered.

The press cake was slurried with 500 parts of water and 23.0 parts of 100% hydrochloric acid were added as a 30% solution. The mixture was iced to 10° C., 14 parts of sodium nitrite were added and a distinct excess of nitrite and acidity to Congo red were maintained for 1 hour.

A solution of 26.4 parts of resorcin was made in 500 parts of water and cooled to 0° C. Then 44 parts of sodium carbonate were added.

The solution of the tetrazo was slowly added to the resorcin solution over a period of one-half hour whilst holding the temperature at 0°–5° C. The mixture was stirred 1 hour, heated to 70° C. and salted to precipitate the product. The product was filtered and dried at 70°–75° C. in an air dryer.

The product was a dark, water-soluble powder which is represented by the formula

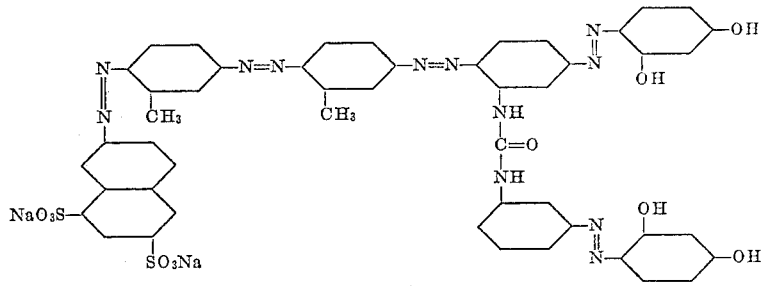

A dyeing was made from an aqueous solution of the product and this dyeing was aftertreated as follows: Dissolve 0.4 gram of the product in 100 cc. of water at 190°–200° F. and add 0.08 gram of sodium carbonate to assist the solution. Dilute with stirring to a total volume of 500 cc. with water at approximately 160° F. and add 40 cc. of a 10% solution of Glauber's salt. Wet out a 10 gram piece of rayon with water, squeeze partially dry and place this in the dye bath. Raise the temperature of the dye bath to 180°–190° F. during a period of 15 minutes and hold the dye bath at that temperature for one hour. Stir at frequent intervals during the dyeing. At the end of one hour remove the dyeings and rinse in cold water.

The rinsed direct dyeing from the above operation is entered into 500 cc. of water at 130°–140° F. Then approximately 10 cc. of 10% formaldehyde (25 cc. of approximately 37% formaldehyde by weight diluted to 250 cc. with water) is added and the bath is held at this temperature for 20 minutes. The dyeing is then removed, rinsed and dried.

An alternative aftertreatment which is the preferred procedure because of its economy and ease of application is carried out as follows: At the end of the dyeing period, 10 cc. of 10% formaldehyde are added to the dye bath at bath temperature. The dyeing is removed after 20 minutes, rinsed and dried.

A dyeing with a red-brown shade was obtained which showed excellent fastness to washing. There was substantially no change in the shade or brightness of the dyeing effected by the treatment with formaldehyde.

*Example II*

The first two couplings, namely 2-amino-naphthalene - 6,8 - disulfonic acid→1-amino-3-methyl - benzene→1 - amino - 3-methyl-benzene, were made and clarification and isolation were effected as described in Example I.

The press cake was slurried with 800 parts of water, 7 parts of sodium carbonate were added and the mixture was heated to 85° C. Whilst holding the temperature at 85° C., 6.8 parts of crystalline sodium acetate were added and then 26 parts of 4-nitro-benzoyl-chloride were slowly added as a 20% carbon tetrachloride solution, the additions being made in small portions over a period of two hours. Sodium carbonate was added from time to time to maintain the solution at all times slightly alkaline to Brilliant Yellow. The completion of the condensation was determined by test. This test was made in the following manner: A cooled sample of the reaction mixture was made acid to Congo red and sodium nitrite was added until an excess remained at the end of 10 minutes. A sodium carbonate solution of 2-phenyl-amino-5-hydroxy-naphthalene-7-sulfonic acid was added to form a coupling product. A small piece of cotton was dyed with this solution. The condensation was considered complete when the shade difference of the dyeings between the last two tests was slight.

When condensation was completed, the charge was salted 25% on volume, stirred one hour and filtered.

The press cake was slurried with 800 parts of water and sodium carbonate was added as required to make the charge medium alkaline to Brilliant Yellow. The mixture was heated to 85°±1° C. and 14.6 parts of sodium disulfide were rapidly added. The mixture was agitated one hour at this temperature, whilst maintaining a strong excess of disulfide. The reduction was then considered to be complete. The mixture was salted 25% on volume, stirred one hour and filtered.

The press cake was diazotized, coupled to 3,3'-diamino-sym.-diphenyl-urea, and isolated as in the final coupling of Example I.

The press cake was slurried with 500 parts of water and 23.0 parts of 100% hydrochloric acid were added in the form of a 30% solution. The mixture was iced to 10° C. and tetrazotization was effected by adding 14 parts of sodium nitrite. A distinct excess of nitrite and acidity to Congo red was then maintained for an hour, dissolved in 500 parts of water, cooled to 0° C. and 44 parts of sodium carbonate were added.

Add the solution of the tetrazo in a small stream over a period of half an hour, holding the temperature at 0–5° C. Stir an hour and heat to 70° C. Salt 20% and filter. Dry at 70–75° C. in an air dryer.

The product was a dark, water-soluble powder which is represented by the formula

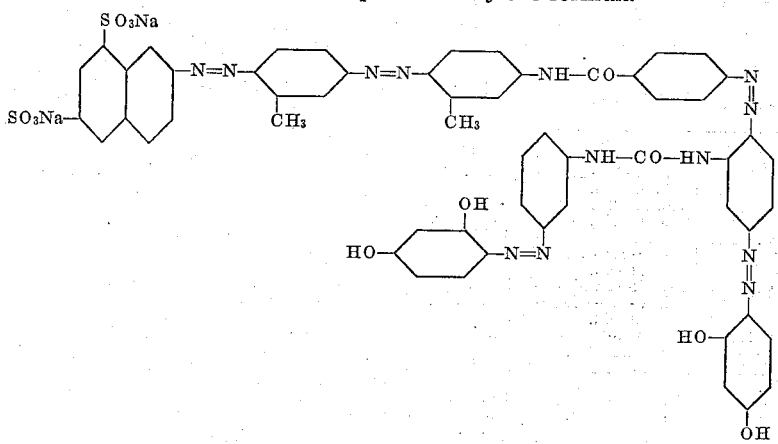

When dyed and after treated as described in Example I, dyeings of a yellow-shade of brown were obtained which had excellent fastness to washing. No material change in shade or brightness was effected by the formaldehyde treatment.

*Example III*

Diazotized 2-amino-naphthalene-6,8-disulfonic acid was coupled with 1-amino-3-methyl-benzene as described in Example I. This coupling product was condensed with 3-nitro-benzoyl chloride and reduced as described in Example II. The product was diazotized and coupled with 1-amino-3-methyl-benzene and then diazotized and coupled with 3,3'-diamino-sym.-diphenyl urea as described in the foregoing examples.

The isolated press cake was slurried, tetrazotized and coupled with 1,3-dihydroxy benzene as described in Examples I and II, and the product was isolated.

The product was a dark powder which was soluble in water. When dyed and aftertreated as described in Example I, a dyeing of a yellow-brown shade was obtained which was fast to washing. The product is represented by the formula acid, 1-amino-naphthalene-7-sulfonic acid, 2-amino-naphthalene-7-sulfonic acid, 4-nitro-aniline, 4-nitro-2-amino-toluene, 5-nitro-2-amino-anisole, 2,4-dinitro aniline, 2,4-diethyl-aniline, 2,4-dibutyl-aniline, 2,5-diethoxy-aniline, 2-n-bu-

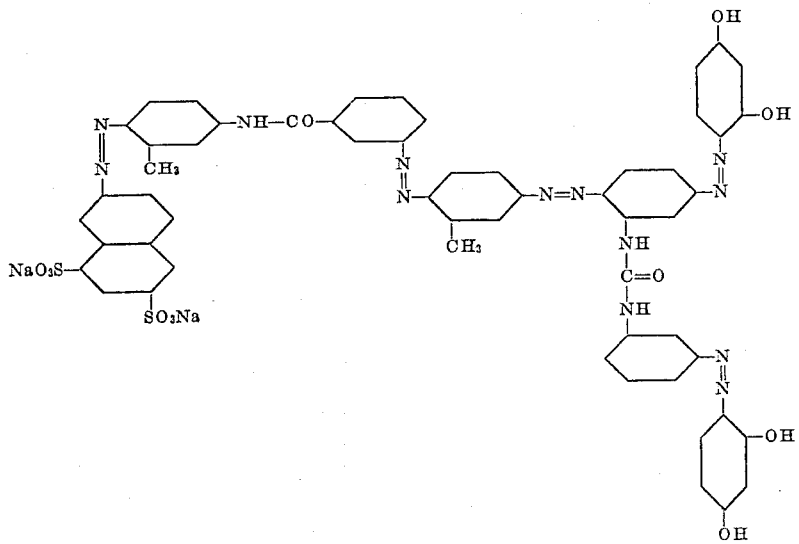

The compounds indicated in the following table were made by processes similar to those described in the foregoing examples. The aftertreatment of these dyeings with formaldehyde had the same effect as that described in Examples I to III. The shades are those produced by aftertreatment with formaldehyde.

toxy-3-bromo-aniline, 2-bromo-4-n-hexyl-aniline and 2-ethyl-4-n-propoxy-aniline.

As illustrations of others of the many B components are: 2-methoxy-aniline, 2-ethoxy-aniline, 1-(4'-amino-benzoyl-amino)-2-methoxy-benzene, 1-(3'-amino-benzoyl-amino)-2-methoxy-benzene, 2,5-diethoxy-aniline, 1-(4'-amino-

*Table I*

| Example | "A" component | First "B" component | Second "B" component | Fourth component | Fifth component | Shade of aftertreated dyeing |
|---|---|---|---|---|---|---|
| IV | 2-amino-naphthalene-6,8-disulfonic acid. | 2,5-dimethoxyaniline. | 1-amino-3-methyl benzene. | 3,3'-diamino-sym.-diphenyl urea. | 1,3-dihydroxy-benzene. | Blue chocolate brown. |
| V | Aniline-2,5-disulfonic acid. | 1-amino-3-methyl benzene. | do | do | do | Brown. |
| VI | 2-amino-naphthalene-4,8-disulfonic acid. | Aniline. | do | do | do | Do. |
| VII | 2-amino-naphthalene-6,8-disulfonic acid. | 1-amino-3-methylbenzene. | 1-amino-naphthalene-6-sulfonic acid. | do | do | Do. |
| VIII | 4-amino-benzene sulfonic acid. | Aniline. | do | do | do | Chocolate brown. |
| IX | do | do | 1-amino-3-methyl-benzene. | do | do | Yellow brown. |
| X | 3-amino-benzene sulfonic acid. | 1-amino-naphthalene-6-sulfonic acid. | do | do | do | Brown. |
| XI | Aniline-2,5-disulfonic acid. | do | 1-amino-naphthalene-6-sulfonic acid. | do | do | Chocolate brown. |
| XII | do | 1-amino-naphthalene. | do | do | do | Brown. |
| XIII | do | 1-amino-3-methyl benzene. | do | do | do | Do. |
| XIV | 2-amino-naphthalene-6,8-disulfonic acid. | 1-amino-naphthalene-6-sulfonic acid. | do | do | do | Blue-brown. |
| XV | do | 1-amino-naphthalene. | do | do | do | Brown. |
| XVI | do | 1-amino-3-methyl benzene. | do | do | 3,5-dihydroxy benzoic acid. | Do. |
| XVII | do | do | do | do | 3,5-dihydroxy toluene. | Do. |

A large variety of first or A components can be used to produce dyes similar in shade and other properties to those specifically described. As illustrations of such are mentioned: 2-amino-benzene sulfonic acid, 2-amino-4-chloro-benzene sulfonic acid, 2-amino-4-methyl-benzene sulfonic acid, 3-amino-benzene-6-methoxy-benzene sulfonic acid, 1-amino-naphthalene-6-sulfonic benzoylamino)-2,5-diethoxy benzene, 1-(3'-amino-benzoyl amino)-2,5-diethoxy-benzene, 1-(4'-amino-benzoyl-amino)-naphthalene-6-sulfonic acid, 1-(3'-amino-benzoyl-amino)-naphthalene-7-sulfonic acid, 1-(4'-amino-benzoyl-amino)-naphthalene, 2,5-di-methyl-aniline, 1-(3'-amino-benzoyl-amino)-2-methoxy-5-methyl-benzene, 1-(4'-amino-benzoyl-amino)-2-ethyl-4-n-propoxybenzene and 1-naphthylamine-6,8-disulfonic acid.

As illustrations of other last components which produce the described results in the indicated combinations are 1,3,5-trihydroxy-benzene, 3,5-dihydroxy-chloro-benzene, 3,5-dihydroxy-cyano benzene, 3,5-dihydroxy-bromo-benzene, 3,5-dihydroxy-benzene sulfonic acid, 3,5-dihydroxy-n-hexoxy-benzene and 3,5-dihydroxy-aniline.

Deeper shades with better light fastness are produced by aftertreating the dyeings of the new colors with metal salts, such as copper salts. The after-metallizing operation may be performed similarly to the procedures for the aftertreating with formaldehyde by substituting for the 10 cc. of formaldehyde solution an equal amount of a 5% solution of an appropriate water-soluble metal salt, such as a 5% solution of hydrated cupric sulfate. In all cases, the operation is continued for about twenty minutes, at the end of which time the treated dyeings are removed, rinsed and dried.

Improvement in fastness properties both to light and to washing consists in a combination of the formaldehyde and after-metallizing treatment. The double after-treatment operation may be done either in the dyebath or in a fresh bath as described in Example I. It consists in adding the formaldehyde solution as described, and after twenty minutes the solution of metal salt. Twenty minutes thereafter the dyeings are removed, rinsed and dried. Water-soluble metal salts of various metals can be used for metallizing the dyeings, those having atomic weights between 50 and 65 being the most suitable.

Instead of nitrobenzoylating the monazo compound and reducing before diazotizing and coupling as described in Example III, either the disazo compound can be nitro-benzoylated and reduced as in Example II or both the monazo compound and the disazo compound can be nitrobenzoylated and reduced.

Accordingly the pentakisazo compounds may contain a bridging benzoylamino group in both B components or in either of them.

The compounds are most conveniently produced in the form of their alkali-metal salts, such as the sodium or potassium salts, but the acid forms can be readily made from the salts by methods well known in the art. Many minor variations can be made in the processes of making the compounds without departing from the invention.

The preferred embodiments of the invention are those in which the A component is a naphthylamine disulfonic acid, the B components are compounds of the benzene series and the D component is resorcin.

The invention provides new soluble pentakisazo compounds which are especially useful for dyeing cellulosic fibers, such as cotton, regenerated cellulose rayon and similar dyeable fibers in bright shades of brown from aqueous solutions. When the direct dyeings are treated with formaldehyde, complexes are formed without materially changing the shade or brilliance of the dyeing. The new compounds provide means of producing dyeings in pleasing shades of brown which have excellent washing fastness. While the light fastness of the formaldehyde treated dyeings are good, some improvement in light fastness can be effected by metallization but treatment with metal salts generally effects a variation from the shade of the direct dyeing.

From the foregoing disclosure it will be recognized that the invention is susceptible of modification without departing from the spirit and scope thereof and it is to be understood that the invention is not restricted to the specific illustrations thereof herein set forth.

We claim:
1. A compound which in the form of its acid is represented by the formula

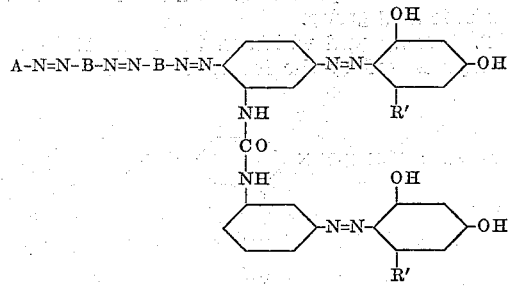

wherein A is the radical of a diazotizable arylamine of a group consisting of the amino benzenes and amino naphthalenes represented by the formulae

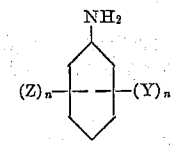

and

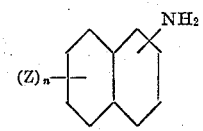

in which Y is from a group consisting of hydrogen, alkyl having 1 to 6 carbons, the corresponding alkoxy groups, halogen and nitro, $n$ is 1 to 2 and Z is from a group consisting of hydrogen and sulfonic acid; each B is a residue after coupling and diazotization of an arylamine of a group represented by the formulae

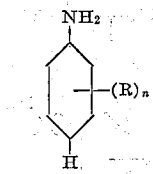

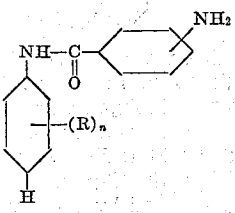

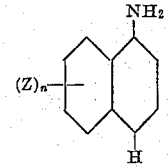

and

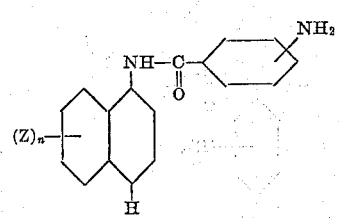

wherein R is from a group consisting of hydrogen, alkyl having 1 to 6 carbons and the corresponding alkoxy groups, —H represents the coupling position and $n$ is 1 to 2; and R' is one of a group consisting of hydrogen, alkyl having 1 to 6 carbons, the corresponding alkoxy groups, hydroxy, amino, halogen, cyano, carboxy and sulfonic acid; said compound containing at least one sulfonic acid group.

2. A compound which in the form of its acid is represented by the formula

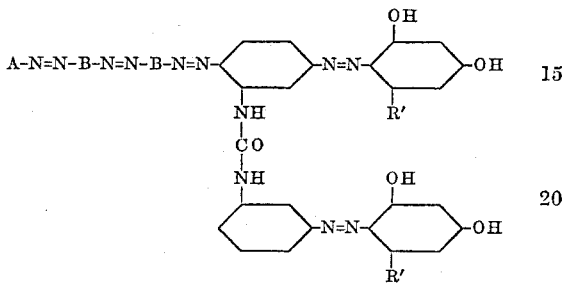

wherein A is the radical of a diazotizable arylamine of a group consisting of the amino benzenes and amino naphthalenes represented by the formulae

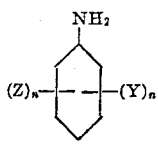

and

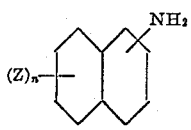

in which Y is from a group consisting of hydrogen, alkyl having 1 to 6 carbons, the corresponding alkoxy groups, halogen and nitro, $n$ is 1 to 2 and Z is from a group consisting of hydrogen and sulfonic acid; the B radicals are residues after coupling and diazotization of unlike arylamines of a group represented by the formulae

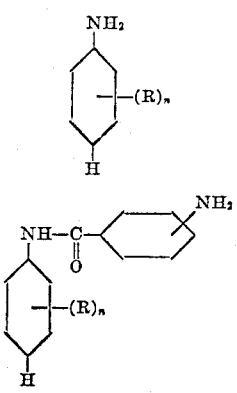

and

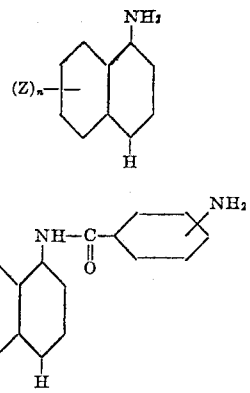

wherein R is from a group consisting of hydrogen, alkyl having 1 to 6 carbons and the corresponding alkoxy groups, —H represents the coupling position and $n$ is 1 to 2; and R' is one of a group consisting of hydrogen, alkyl having 1 to 6 carbons, the corresponding alkoxy groups, hydroxy, amino, halogen, cyano, carboxy and sulfonic acid; said compound containing at least one sulfonic acid group.

3. An azo compound which in the form of its acid is represented by the formula

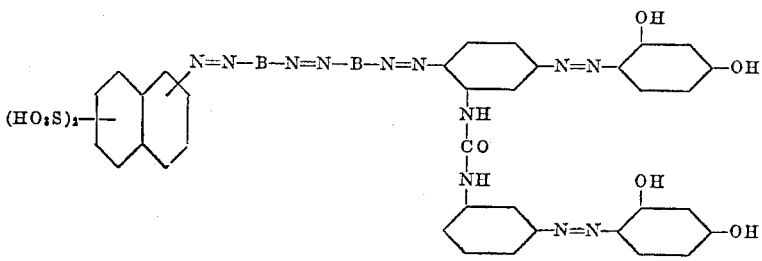

in which each B is a residue after coupling and diazotization of an arylamine of the benzene series represented by the formulae

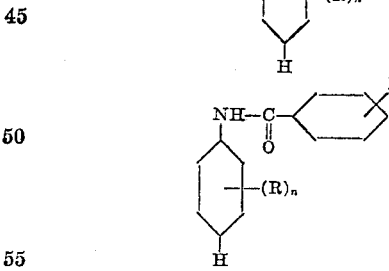

wherein R is from a group consisting of hydrogen, alkyl having 1 to 6 carbons and the corresponding alkoxy groups; $n$ is 1 to 2; and —H is the coupling position.

4. An azo compound which in the form of its acid is represented by the formula

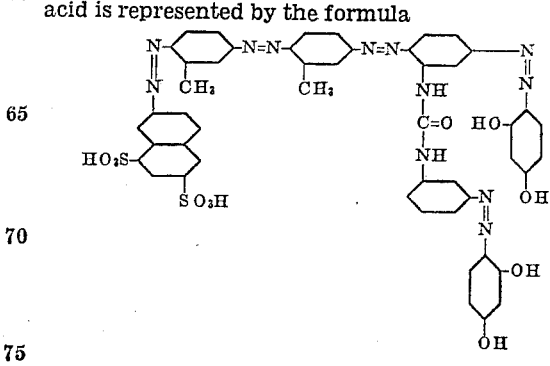

5. An azo compound which in the form of its acid is represented by the formula

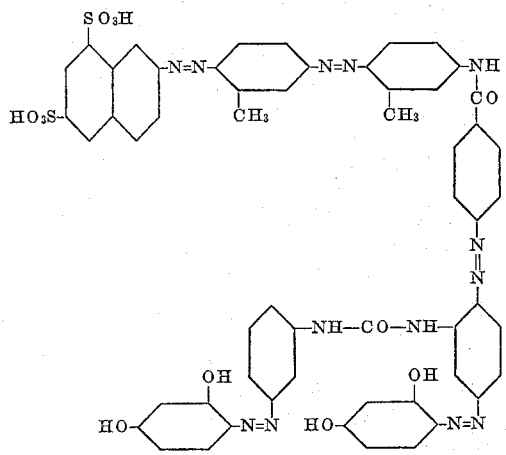

6. An azo compound which in the form of its acid is represented by the formula

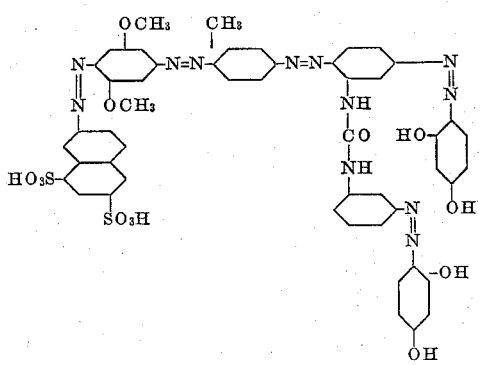

7. The formaldehyde complex of a compound of claim 1.
8. The formaldehyde complex of a compound of claim 2.
9. The formaldehyde complex of a compound of claim 3.
10. The formaldehyde complex of a compound of claim 4.
11. The formaldehyde complex of a compound of claim 5.
12. The formaldehyde complex of a compound of claim 6.
13. The process which comprises diazotizing an arylamine of a group consisting of amino benzenes and amino naphthalenes represented by the formulae

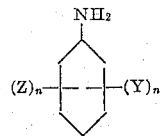

and

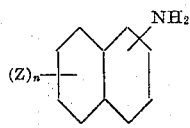

in which Y is from a group consisting of hydrogen, alkyl having 1 to 6 carbons, the corresponding alkoxy groups, halogen and nitro, $n$ is 1 to 2, and Z is one of a group consisting of hydrogen and sulfonic acid; coupling in a position para to the amino group with an arylamine of the group represented by the formulae

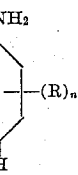

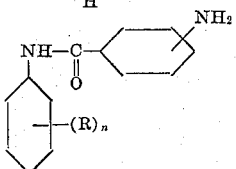

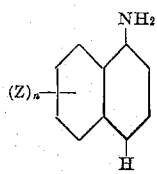

and

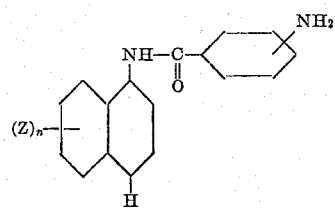

wherein R is from a group consisting of hydrogen, alkyl having 1 to 6 carbons and the corresponding alkoxy groups, —H represents the coupling position and $n$ is 1 to 2; diazotizing the monazo compound thus produced and coupling in a position para to the amino group with an arylamine of last named group; diazotizing the disazo compound thus produced and coupling with 3,3'-diphenyl urea; tetrazotizing the trisazo compound thus produced and coupling with two mol equivalents of a dihydroxy benzene represented by the formula

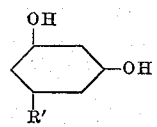

in which R' is one of a group consisting of hydrogen, alkyl having 1 to 6 carbons, the corresponding alkoxy groups, hydroxy, amino, halogen, cyano, carboxy and sulfonic acid; said components being selected so that the product of coupling contains at least one sulfonic acid group.

14. The process in accordance with claim 13 in which the monazo compound is benzoylated to a nitro-benzoylamino derivative and the nitro group is reduced to amino before the monazo compound is diazotized, and the disazo compound is benzoylated to a nitro-benzoylamino derivative and the nitro group is reduced to amino before the disazo compound is diazotized.

15. The process in accordance with claim 13 in which the monazo compound is benzoylated to a nitro-benzoylamino derivative and the nitro group is reduced to amino before the monazo compound is reduced.

16. The process in accordance with claim 13 in which the disazo compound is benzoylated to a nitro-benzoylamino derivative and the nitro group is reduced to amino before the disazo compound is diazotized.

SWANIE S. ROSSANDER.
CHILES E. SPARKS.

Certificate of Correction

Patent No. 2,278,492.  April 7, 1942.

SWANIE S. ROSSANDER ET AL.

It is hereby certified that errors appear in the printed specification of the above numbered patent requiring correction as follows: Page 1, second column, line 46, for the word "dyes" read *dyer;* page 7, first column, lines 25 to 28 inclusive, for that portion of the formula reading

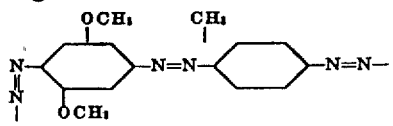

read

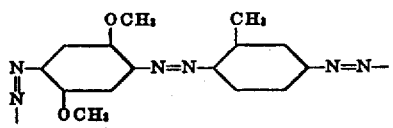

and that the said Letters Patent should be read with these corrections therein that the same may conform to the record of the case in the Patent Office.

Signed and sealed this 9th day of June, A. D. 1942.

[SEAL]

HENRY VAN ARSDALE,
*Acting Commissioner of Patents.*